United States Patent [19]

Ortiz, Jr. et al.

[11] Patent Number: 4,739,162

[45] Date of Patent: Apr. 19, 1988

[54] LASER BEAM INJECTING SYSTEM

[75] Inventors: Angel L. Ortiz, Jr., Ballston Lake; John L. August, Jr.; Tushar S. Chande, both of Schenectady; Marshall G. Jones, Scotia, all of N.Y.

[73] Assignee: General Electric Company, Schenectady, N.Y.

[21] Appl. No.: 10,657

[22] Filed: Feb. 4, 1987

[51] Int. Cl.$^4$ .............................................. B23K 9/00
[52] U.S. Cl. .............................. 250/227; 219/121 LW
[58] Field of Search .............. 250/227; 350/96.1, 96.2; 219/121 L, 121 LU, 121 LV, 121 LW, 121 LX

[56] References Cited

U.S. PATENT DOCUMENTS

| | | | |
|---|---|---|---|
| 4,378,480 | 3/1983 | Langhans | 219/121 LW |
| 4,516,858 | 5/1985 | Gelbwachs | 250/227 |
| 4,565,736 | 1/1986 | Jones et al. | 219/121 L |
| 4,676,586 | 6/1987 | Jones et al. | 350/96.20 |
| 4,681,396 | 7/1987 | Jones | 350/96.18 |

FOREIGN PATENT DOCUMENTS 92133  2/1982  Japan .

OTHER PUBLICATIONS

"Precision, Post-Objective, Two-Axis, Galvanometer Scanning", by Pelsue, Society of Photo-Optical Instrumentation Engineers, vol. 390, pp. 70-78, 1983.
"Ocular Manipulator for Robotic Vision", by Montagu et al., Society of Photo-Optical Instrumentation Engineers, vol. 449, pp. 88-93, 1983.
Description of Robolase Systems, Inc. 'Octopus' System from New Equipment Reporter, Jun. 1985, vol. 43, No. 6.
'Octopus' System Technical Specifications and Drawings published by Robolase Systems, Inc.
Descriptive Information published by Robolase Systems, Inc., on the "Robolase Star Coupler", Laser to Fiber Coupler, and 'Octopus' system.
Descriptive Information published by General Scanning, Inc., on the G350D Galvanometer Scanner and the XY3035 Scanner.
Descriptive Information published by Lumonics on its "Multiflex" Laser Beam Delivery System and Beam Injection into a Permalux Power Fiber.

Primary Examiner—David C. Nelms
Assistant Examiner—Stephone B. Allen
Attorney, Agent, or Firm—Richard V. Burgujian; James C. Davis, Jr.; Paul R. Webb, II

[57] ABSTRACT

A system for injecting successive beam pulses of a pulsed power laser into optical fibers, for transmission therethrough, is disclosed. The system comprises four lens, four fiber groups with the tips thereof respectively proximate the focal points of the lenses, two galvanometer driven mirrors for directing the laser beam through one of the lenses for focusing onto a selected fiber tip, and control means to drive the galvanometers to reorient the two mirrors between laser beam pulses into successive pairs of predetermined positions effective to inject the successive beam pulses into selected fibers. Failure to reorient the mirrors before the succeeding beam pulse arrives results in laser shutdown. Means are provided for detecting a malfunction of the mirrors, fracture of a lens or a missed fiber injection and, in either case, shutting down the laser.

21 Claims, 8 Drawing Sheets

LASER BEAM INJECTING SYSTEM

The present invention is directed in general to laser systems used in manufacturing and, more particularly, to a laser system which enables sharing a single laser among multiple workstations.

BACKGROUND OF THE INVENTION

High power gas and solid state lasers have gained acceptance in manufacturing today by reducing costs and improving product quality. The utilization of such lasers as a percentage of the time they are available for use is, however, low. This is the case since, typically, such applications are set up on a one laser per workstation basis. As a result, these applications experience a high set-up to process time ratio and a large capital cost per workstation.

A design objective of such laser workstations is to provide flexibility by applying the beam generated by a single power laser, e.g. to effect a weld, at a plurality of physically different locations and thereby improve laser utilization. One technique known in the art for providing such flexibility is to direct the power laser beam through one end of an optical fiber so that the other end of the fiber may be moved between a plurality of different locations on a workpiece. Apparatus for the practice of such a technique is disclosed in U.S. Pat. No. 4,564,736. A second technique known in the art for providing such flexibility is to divert a power laser beam among different points on a workpiece and/or between workstations by means of mirrors and refracting elements. Typically, the total distance that the beam of a commercially available rod laser can travel, before diverging to an unusable size, is small (e.g. less than 2 meters). Thus, the total number of workstations among which a laser beam can be diverted is greatly limited by the total distance the beam can travel. As a result, the improvement in laser utilization achievable by diverting the laser beam in this fashion is limited. A third technique known in the art to increase flexibility of laser use is to split the power laser beam into multiple portions each of which is diverted to a different work location. A substantial drawback to this technique is the reduced laser power, caused by the beam splitting, delivered to each work location.

While the above-described techniques are intended to improve laser utilization, the capital cost of the system equipment required to implement such techniques is substantial. In the context of power laser utilization, it is therefore important to safeguard the substantial investment in such system equipment against damage caused by misdirection or scattering of the power laser beam. Such misdirection or scattering may, for example, simply be caused by the failure of a beam diverting component of the system, such as a mirror or refracting element that shatters or slips on its mounting. The component failure must be promptly sensed and appropriate action taken to obviate or minimize damage that can otherwise result.

With respect to component failures in such systems, a second consideration of equal importance is maintenance of a safe work environment for personnel attending the laser system. It is highly undesirable to have the power laser beam misdirected or scattered due to a component failure where injury to personnel in the vicinity may result. One solution to the personnel safety problem is to maintain the entire system in a Class I enclosure, as defined by ANSI Standard Z136.1, an enclosure classification well known in the art. One drawback to this solution is the resulting inaccessibility of system components to the attending personnel. A second drawback is the additional cost incurred to construct the Class I enclosure. It is further noted that this solution does nothing to minimize equipment damage in the case of component failure.

A different system for improving laser utilization, described hereinbelow and in copending U.S. patent application Ser. No. 944,771 filing date 12-22-86, enables the full power of a single power laser to be injected into a plurality of optical fibers for transmission to remote workstation locations. It is therefore a principal object of the present invention to provide such a system for improving laser utilization that is further adapted to minimize damage to its components and injury to attending personnel in the case of a component failure.

SUMMARY OF THE INVENTION

In accordance with the present invention there is provided apparatus for injecting a pulsed laser beam into a plurality of optical fibers. The apparatus comprises a lens for focusing the laser beam, means for supporting a group of one or more optical fibers with the tips thereof positioned proximate the lens focal point, reflecting means for reflecting the laser beam, and positioning means for orienting the reflecting means into predetermined positions each effective to reflect the laser beam through the lens onto a different selected one of said fiber tips for injection therein. The apparatus further comprises control means for controlling the positioning means, the control means including means for generating an enable signal synchronized with the laser beam and including periodic window portions each corresponding to the pulsed laser beam being in an off state. The control means further includes processing means for generating an address signal following commencement of a current enable signal window portion, the address signal being effective to cause the positioning means to orient the reflecting means into the corresponding predetermined position. To enhance operating safety, the processing means is adapted to generate a laser shutdown signal if it does not receive an indication, before the current window portion closes, that the positioning means has successfully oriented the reflecting means into the predetermined position.

In the illustrated embodiment, the reflecting means comprises first and second mirrors for respectively scanning the laser beam along first and second coordinate axis directions and the positioning means comprises first and second galvanometers for respectively orienting the first and second mirrors. The illustrated embodiment further includes four lenses and four corresponding groups of optical fibers. The processing means comprises a digital computer to generate two digital address signals for the two mirrors and the control means is adapted to convert those digital signals into analog signals to drive the galvanometers. The first and second mirrors are housed in a first enclosure, adapted to permit laser beam entry and exit. The lenses, fiber supporting means and first enclosure are housed in a second substantially light tight enclosure, so that the only light within the first or second enclosure derives from the laser beam. To further enhance operating safety, a first light sensitive element, such as a photodiode, is positioned to provide indication of an increase in the light level within the first enclosure above a threshold level corresponding to correct reflection by the mirrors. The exceeded threshold is an indication of mirror malfunction and the light sensitive element indication thereof is used to shut down the laser. A second light sensitive element is responsive to the light level at a rear wall within the second enclosure and beyond the fiber tips, so that a missed fiber injection would result in an increase in the light level proximate the rear wall. The second light sensitive element provides an indication when the rear wall light level exceeds a threshold level corresponding to correct fiber injection and this indication is used to shut down the laser.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

DESCRIPTION OF THE INVENTION

Figure 1:
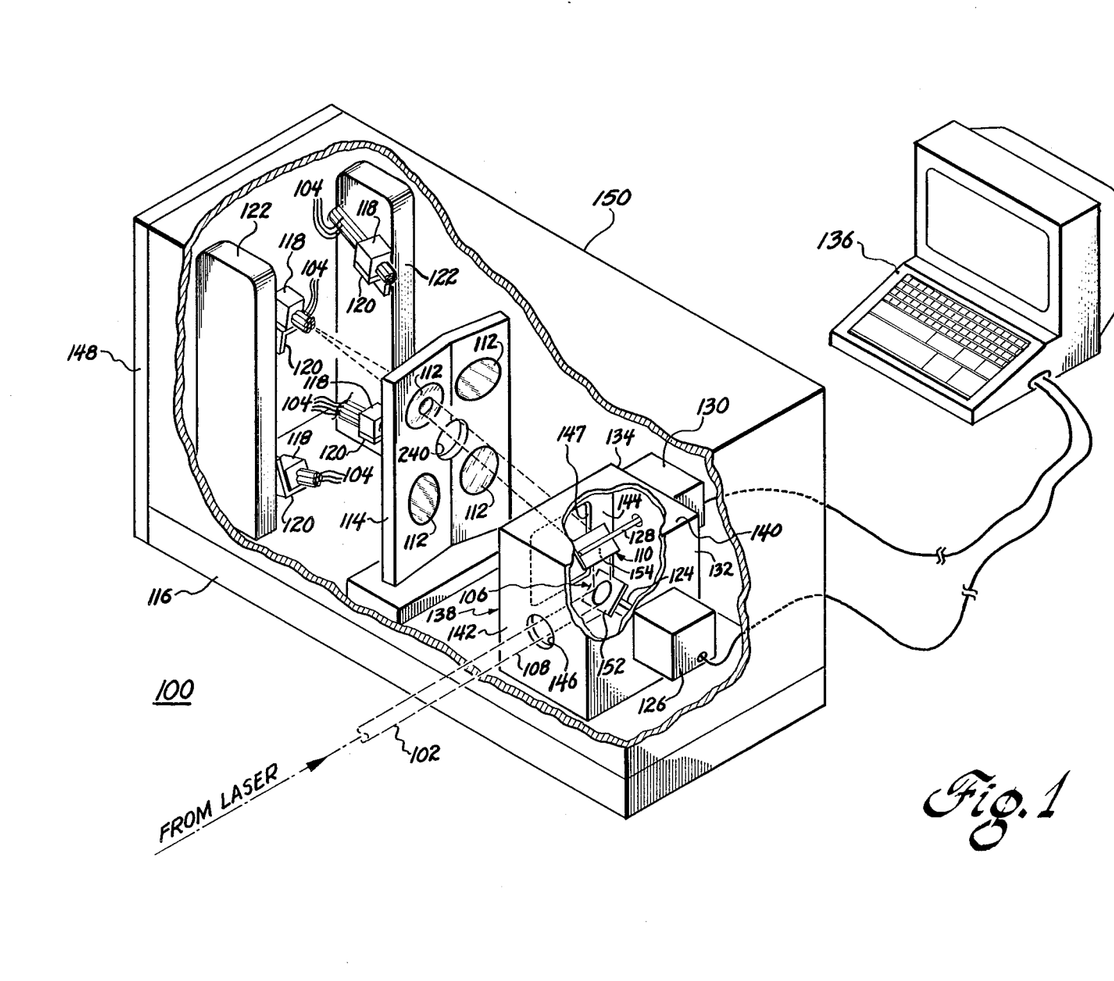
FIG. 1 is an isometric representation of a laser beam injecting system constructed in accordance with the present invention.

Referring now to the drawings, FIG. 1 illustrates a laser beam directing system 100, constructed in accordance with the present invention, for injecting a power laser beam 102 into a selected one of a plurality of optical fibers 104. System 100 includes a mirror 106 which reflects an incident portion 108 of the laser beam onto a second mirror 110. The beam is reflected off of mirror 110 which directs it to one of four focusing lenses 112 for focusing the beam onto the tip of one of optical fibers 104. Each lens 112 is preferably a commercially available antireflection coated quartz plano-convex lens, with the planar face presented to the fiber tips. The lenses are rigidly mounted in a lens holder 114 which is in turn rigidly mounted to a base member 116, which may comprise an optical breadboard. A group of one or more optical fibers is associated with each lens, the respective fiber tips of each group being positioned proximate a focal point of their associated lens. Each group of fibers is rigidly held, with the tips thereof so positioned, in a fiber holder 118. The fiber holders are rigidly affixed to brackets 120 which are rigidly mounted to two support members 122. Support members 122 are in turn rigidly mounted to base member 116. It is preferred herein that each fiber holder be fabricated of a laser beam transparent material in order to avoid damage that would otherwise result should the laser beam be momentarily misdirected. Each fiber holder should also enable easy removal and replacement of fibers as well as axial adjustability of each fiber along the axis of the fiber. Such an optical fiber holder is disclosed in copending application Ser. No. 06/926,281 filed 11/31/86.

Mirror 106 is rigidly affixed to a shaft 124 of a galvanometer 126 so that the mirror moves with the shaft. Similarly, mirror 110 is mounted on a shaft 128 of a galvanometer 130 for movement therewith. Galvanometers 126 and 130 may be provided as a moving-iron galvanometer scanner model XY3035 manufactured by General Scanning, Inc. of Watertown, Mass. Galvanometers 126 and 130 are respectively mounted on vertical support members 132 and 134. Each of these support members includes an opening through which the galvanometer shaft freely projects. The shaft of each galvanometer included with the XY3035 scanner extends from a mounting surface of the galvanometer that includes a plurality of threaded mounting holes. Each such galvanometer is therefore preferably mounted to its respective support member by bolts passed through the support member to engage the threaded mounting holes. It is noted that the two galvanometers included in the above-noted XY3035 galvanometer scanner are mounted in system 100 to achieve the mirror and shaft positions described herein and not as provided in the XY3035 scanner package, in order to successfully practice the present invention.

System 100 further includes control means comprising a digital computer 136 for controlling the respective positions of galvanometer shafts 124 and 128, and mirrors 106 and 110 respectively affixed thereto, in a programmed fashion. The control means further includes an interface circuit, not shown in FIG. 1, coupled between the galvanometers and computer and described in detail below. As more fully described below, the galvanometers are controlled to orient the two mirrors into pairs of predetermined positions. Each such position pair is effective to direct the laser beam through one of lenses 112 onto the tip of a particular optical fiber for transmission of the beam therethrough.

System 100 additionally includes a removable mirror enclosure 138 comprising a top 140 and sides 142 and 144. The sides and top of enclosure 138 are adapted to fit with support members 132 and 134 to completely enclose mirrors 106 and 110. The mirror enclosure includes an opening 146 in its side 142 to allow entry therethrough of incident portion 108 of the laser beam. The mirror enclosure includes a second opening 147 in its side 144 to enable exit of the laser beam after reflection off of mirror 110. The second opening is configured to enhance the operating safety of system 100, in a manner more fully described below. System 100 additionally includes a rear wall 148, affixed to base member 116. The rear wall preferably carries cable connectors to enable penetration therethrough of optical fibers 104. An overall enclosure 150 is adapted to fit with the base member and rear wall in order to provide a light tight enclosure of the optical apparatus (mirrors, lenses, etc.) of system 100. Enclosure 150 includes an opening (not illustrated in FIG. 1) to enable admission of the incident laser beam. However, the path of the incident laser beam from the laser to enclosure 150 should also be enclosed by shrouding means such as a light tight tube, so that substantially the only light being admitted into enclosure 150 derives from the laser beam.

Figure 2:
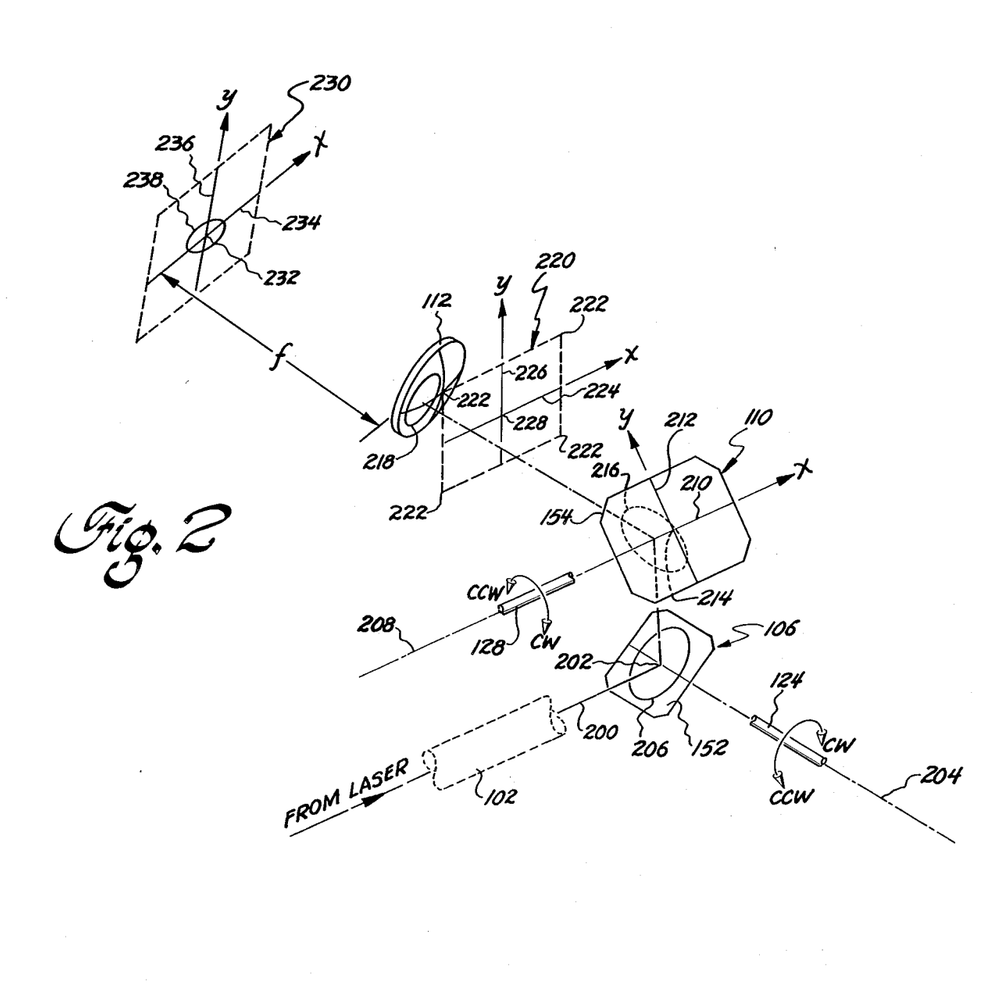
FIG. 2 is a diagrammatic illustration of a laser beam trajectory as directed by the mirrors of the beam injecting system illustrated in FIG. 1.

Mirrors 106 and 110 respectively include front, substantially flat reflecting surfaces 152 and 154 for reflecting the laser beam. Each galvanometer shaft 124 and 128 is rotatable about its respective axis to position the mirror affixed thereto to reflect laser beam 102 onto a particular one of lenses 112 in order to focus the laser beam onto the tip of a particular optical fiber. The trajectory followed by the laser beam as determined by the positions of mirrors 106 and 110 is illustrated in FIG. 2. Only mirrors 106 and 110, portions of galvanometer shafts 124 and 128, one lens 112 and a portion of laser beam 102 are shown in FIG. 2. Laser beam 102 is seen to propagate along a beam axis 200. Mirror 106 is positioned so that axis 200 intersects a center point 202 on reflecting surface 152 of mirror 106. Shaft 124 of galvanometer 126, and hence mirror 106, rotates about an axis 204. Over the angular range of rotation about axis 204, in the practice of the present invention, beam axis 200 always intersects center point 202 on reflecting surface 152. Laser beam 102 projects a spot 206 on reflecting surface 152. Mirror 110 is rotatable about an axis 208. Mirrors 106 and 110 are aligned so that axis 200 of the beam is reflected off of mirror 106 and, over the angular range of rotation of mirror 110 about axis 208 practiced in the present invention, always intersects an "x" center line coordinate axis 210 on reflecting surface 154. Mirror 110 further includes a "y" center line coordinate axis 212 on reflecting surface 154, axes 210 and 212 being mutually orthogonal and intersecting at a center point 214. Laser beam 102, reflected off of mirror 106 onto mirror 110, projects a spot 216 on the latter mirror. It is noted that, in FIG. 2, reflecting surface 154 of mirror 110, which beam 102 strikes, faces away from the reader. For this reason, spot 216 is shown as a hidden feature delineated by a broken line.

In FIG. 2, the mirrors are positioned to direct the laser beam to the lens positioned in the upper left portion of lens holder 114 as viewed in FIG. 1. Thus, beam axis 200 intersects the convex surface of the lens and a spot 218 of the laser beam is projected thereon. Also shown in FIG. 2 is a rectangular lens plane 220 having four vertices 222. Plane 220 is additionally defined to have an "x" center line coordinate axis 224 and a "y" center line coordinate axis 226, orthogonal to axis 224, which intersect at a center point 228. The four lenses are positioned such that a center point on the convex face of each lens is positioned at a different one of the four vertices 222. The optical fiber tips associated with the upper left lens are positioned to lie substantially in a fiber tip plane 230 having a center point 232 at the intersection of an "x" center line coordinate axis 234 and a "y" center line coordinate axis 236 orthogonal to axis 234. As indicated in FIG. 2, the distance from the planar face of the upper left lens to plane 230 is substantially equal to a lens focal length "f". Thus, each of the four lenses have associated therewith a different fiber tip plane positioned substantially the distance "f" from the lens planar face. Each fiber tip plane is oriented to be substantially parallel to the planar face of its associated lens. Mirrors 106 and 110 are adapted to scan the focused laser beam over a scanned area 238 of plane 230 within which the tips of the fibers are positioned. It is preferred herein that the tip of one of fibers 104, as held in fiber holder 118, be positioned at center point 232. With mirrors 106 and 110 positioned to focus the beam on this center fiber tip, the associated lens is positioned so that the axis of the beam passes through the center point of that lens and is perpendicular to both faces of the lens and fiber tip plane 230. Each lens 112 is positioned in that fashion.

Galvanometer shafts 124 and 128, with mirrors 106 and 110 respectively affixed thereto, assume a rest position in the absence of driving signals to control their movement. In the rest position, mirrors 106 and 110 are each oriented with their respective reflecting surfaces at a 45° angle to the respective portions of beam axis 200 intersecting the mirrors. In the rest position, the mirrors direct the laser beam toward lens plane 220 such that the beam axis intersects center point 228 thereof. Referring again to FIG. 1, an opening 240 is provided in lens support 114 in a region including center point 228. Opening 240 is large enough to enable the unobstructed transmission therethrough of the laser beam. A heat sink, not shown in FIG. 1, may be positioned in alignment with opening 240, between supports 122 and in front of rear wall 148, to receive the reflected beam when the mirrors assume the rest position.

With the mirrors in the rest position, axis 200 of the laser beam intersects center point 214 of mirror 110. Using the rest position as a reference position, the scanning of the laser beam by rotation of mirrors 106 and 110 can be better understood. Commencing from the rest position, holding mirror 110 stationary and rotating mirror 106 clockwise (CW) or counter clockwise (CCW) about axis 204, causes the point where beam axis 200 intersects "x" axis 210 of mirror 110 to scan along that "x" coordinate axis, from center point 214, respectively to the right or left, as viewed in FIG. 2. Such rotation of mirror 106 further causes the point where beam axis 200 intersects "x" axis 224 of lens plane 220 to scan along that "x" coordinate axis from center point 228, respectively to the right or left as viewed in FIG. 2. Again commencing from the rest position, but instead holding mirror 106 stationary and rotating mirror 110 clockwise (CW) or counter clockwise (CCW) about axis 208 causes the point where beam axis 200 intersects "y" axis 226 of the lens plane to scan along that "y" coordinate axis, from center point 228, respectively up or down, as viewed in FIG. 2. Note that throughout such rotation of mirror 110 with mirror 106 held stationary in the rest position, the beam axis continuously intersects center points 202 and 214 of mirrors 106 and 110 respectively. It is therefore observed that rotation of mirror 106 effects scanning of the laser beam along the "x" coordinate axis direction of mirror 110, the lens plane and the fiber tip plane. Similarly, mirror 110 rotation results in beam scanning along the "y" coordinate axis direction of the lens and fiber tip planes.

It should now be apparent to one skilled in the art that rotation of both mirrors 106 and 110 is necessary to direct laser beam 102 to any of the four lenses 112. For example, to direct the laser beam to the lens positioned in the upper right portion of lens holder 114, as viewed in FIG. 1, a clockwise rotation of both mirrors 106 and 110 from their respective rest positions is required. In order to direct the focused laser beam onto a particular optical fiber tip, it is necessary to rotate mirrors 106 and 110 each into a unique, predeterminable position. Thus, a unique predetermined pair of mirror positions, for mirrors 106 and 110, corresponds to the beam being focused onto each optical fiber tip. Functioning under the control means, the galvanometers are operated to move the mirrors through a sequence of such predetermined position pairs corresponding to a sequence of optical fibers into which the laser beam is to be injected.

System 100 is especially adapted to enable the power of a single pulsed power laser to be deployed at a plurality of remote workstation locations. This is accomplished by injecting the successive laser beam pulses respectively into selected ones of the fiber tips in rapid succession. The full power of the laser beam is thereby delivered as a plurality of pulses to a remote output end of each fiber into which it is injected, the delivered laser power being limited substantially only by power losses within the fiber. Thus, with a laser and the beam directing system of the present invention connected to a plurality of remote workstation locations by means of a plurality of optical fibers, the full power of the single laser can be delivered to each of those remote locations.

In applications where welding, drilling or cutting are performed at each workstation, as is preferred herein, system 100 is particularly adapted for use with a pulsed power laser such as a pulsed neodymium:yttrium aluminum garnet (Nd:YAG) rod laser, model #SS550 manufactured by Raytheon Corporation of Burlington, Mass. That laser is rated to provide 400 watts average power and a maximum of 50 joules/pulse at a pulse rate of 0 to 200 pulses per second, the pulse length being variable from 0.1 to 10 milliseconds.

Figure 3:
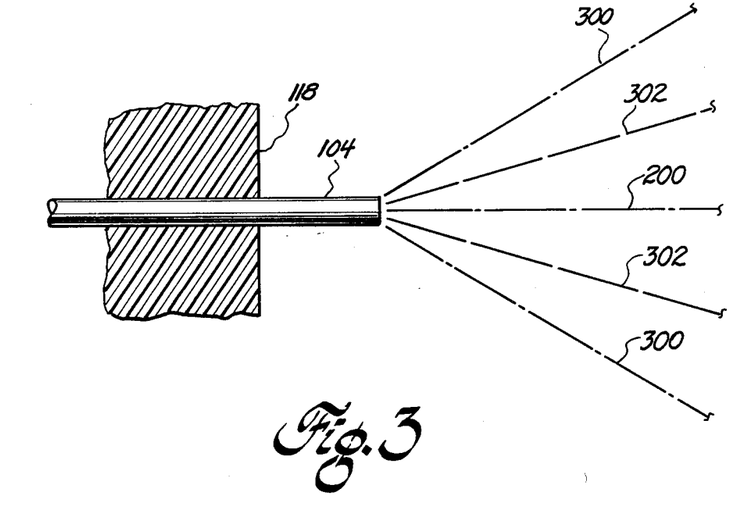
FIG. 3 is a diagrammatic illustration of a laser beam injected into an optical fiber.

The type of laser beam used determines in part the optical fiber material best suited for beam transmission. It is preferred herein that fused quartz fibers be used to transmit the Nd:YAG laser beam. Additionally, the tips of the optical fibers require preparation in order to enable efficient injection of the focused laser beam. One suitable fiber tip preparation technique, preferred herein, is described in the U.S. Pat. No. 4,564,736 which is assigned to the assignee of the present invention and incorporated in its entirety herein by reference. Referring to FIG. 3 and as is known in the art, an intrinsic characteristic of each optical fiber is a cone of acceptance 300, at the tip of fiber 104, within which a focused, converging portion 302 of the laser beam must fall in order to enter the optical fiber and be fully transmitted thereby. Further, the spot size of the focused laser beam on the fiber tip must have a diameter less than or equal to that of the tip. If the diameter of the focused beam spot is greater than the fiber tip diameter, damage may be done to the fiber, fiber holder and/or surrounding surfaces. The cone of acceptance and spot size limitations serve to dictate the focal length of each lens 112. It is also noted that there is some latitude in positioning each fiber tip, substantially along beam axis 200, subject to the above constraints. Thus, each fiber tip need not be positioned precisely at the lens focal point. It is further noted that details of the requisite fiber tip preparation, as disclosed in the above-incorporated 4,564,736 patent, are not illustrated in FIG. 3.

As a further feature of the present invention, reflecting surfaces 152 and 154 of mirrors 106 and 110, respectively, are coated with a dielectric material to enhance their ability to reflect, without damage thereto, the incident power laser beam. The dielectric material coating is selected to provide a high reflectivity for the particular wavelength of laser being used, e.g. 1060 nanometers for the Nd:YAG laser. Further, the dielectric coating characteristically provides a reflectivity that depends on the angle at which the laser beam falls incident thereon, i.e. an angle between the axis of the laser beam and the reflecting surface normal. The coating provides a maximum reflectivity of nearly 100% when the beam is approximately at a prescribed angle to the reflecting surface and provides increasingly lower reflectivities for incident angles greater or less than the prescribed angle. In system 100, the prescribed angle is 45°. Mirrors 106 and 110 can be fabricated in accordance with the above wavelength and prescribed angle specifications by CVI Laser Corporation of Albuquerque, N.Mex. While it would appear that the dielectric coating is better suited for fixed mirror applications, its ability to reflect and withstand, without damage, the power laser beam renders it well suited for use in practicing the present invention. By selecting the distance between the mirrors and the lenses, as well as the between-lens spacing, to minimize the total angular movement required of the mirror, total losses in efficiency due to reduced mirror reflectivity are minimized. In practice, a total range of angle of incidence of ±10° about the prescribed angle was successfully used.

Figure 4:
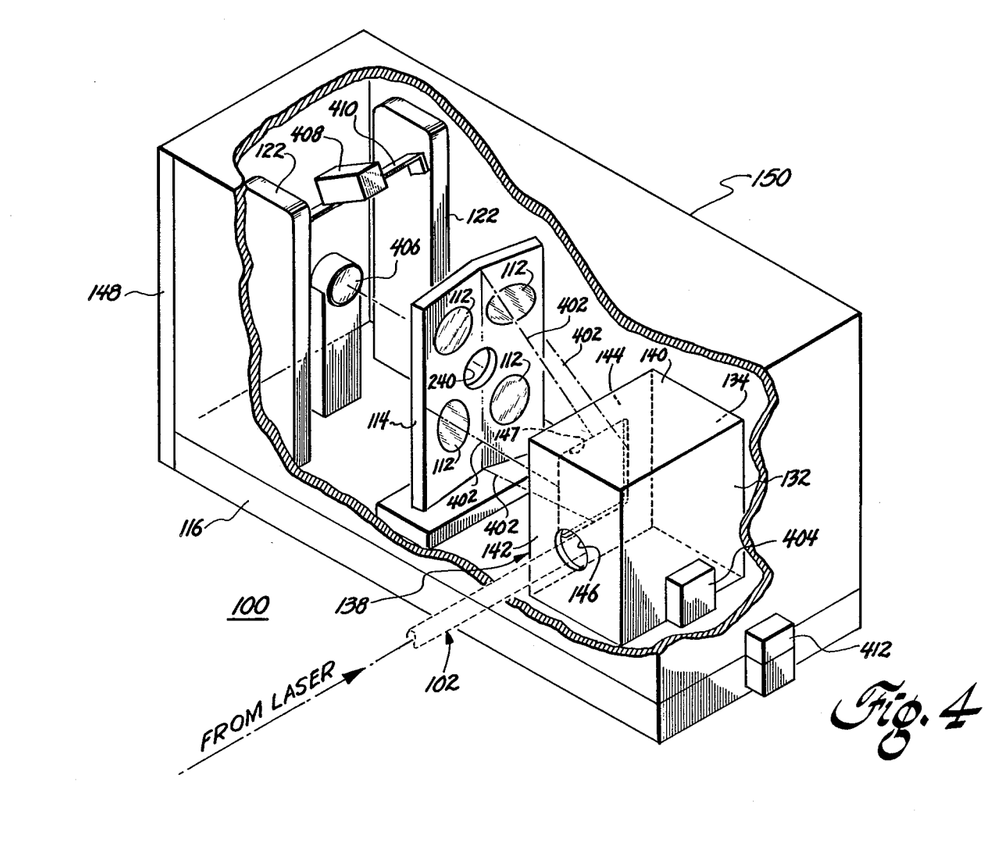
FIG. 4 is an isometric representation of the beam injecting system illustrated in FIG. 1 including additional safety feature not illustrated in FIG. 1.

FIG. 4 illustrates additional features of system 100, not shown in FIG. 1. The galvanometers, mirrors, optical fibers, fiber holders and brackets are not shown in FIG. 4 in order to simplify the illustration. As noted above, mirror enclosure 138 includes opening 147 in its side 144 through which the laser beam exits after reflection off of mirror 110. Opening 147 is configured so that for all possible trajectories along which the beam can reflect off of mirror 110, the reflected beam is constrained to strike lens holder 114. This is illustrated in FIG. 4 by exemplary trajectories 402 which are substantially tangential to the periphery of opening 147 yet still strike the lens holder. As a result, should control of either or both mirrors be lost, e.g. due to a malfunction of computer 136 wherein erroneous position addresses are provided to either or both galvanometers, the power laser beam cannot follow a trajectory outside the lens holder. In such a case, it is necessary to shut down the laser since heating or burning of the components contained within enclosure 150 may otherwise result. The reflection of the laser beam off of the lens holder will cause an increase in the light level within light tight enclosure 150. The increased light level is sensed and the laser shut down in response thereto, in a manner more fully described below.

As further illustrated in FIG. 4, system 100 includes a laser heat sink 406 aligned with opening 240 in lens holder 114 to receive the reflected laser beam when mirrors 106 and 110 assume rest position. It is preferred herein that heat sink 406 be provided as a model 213 laser power meter manufactured by Coherent, Inc. of Auburn, Calif. Thus, upon a failure of the control means to provide signals to drive the galvanometers, the laser beam is safely reflected into the laser power meter.

A light sensitive element 404, such as a photodiode, is mounted at the base of support member 132. Element 404 is adapted to provide an indication of an increase in the light level within the mirror enclosure (formed by enclosure 138 and support members 132, 134) above a level experienced during normal operation of system 100. Since enclosure 150 is light tight, such an increase in light level detected by element 404 would be indicative of a reflected portion of the laser beam remaining within the mirror enclosure. This could be caused by malfunctions such as a cracked mirror or the slippage of a mirror on its respective galvanometer shaft. The increased light level could also result from improper positioning of one or both mirrors caused by a malfunction of the control means for controlling mirror movement. The increased light level may further be caused by the laser beam reflecting off of lens holder 114 and back through opening 147. It is therefore desirable to discontinue operation of system 100 upon element 404 indicating an increased light level. The indication of increased light level is used to shut down the laser that generates beam 102, in a manner more fully described below. It is preferred herein, where the above-noted Raytheon Nd:YAG laser is used in conjunction with system 100, that element 404 be provided as a model no. OSI5L photodiode manufactured by Centronics Corporation of Mountainside, N.J. The model no. OSI5L photodiode has a high sensitivity to the 1060 nanometer wavelength of the Nd:YAG laser.

System 100 additionally includes a light sensitive element 408 mounted and oriented on a support bracket 410 to detect, and provide an indication of, an increase in light level from rear wall 148 above the level experienced during normal system operation. In the case of a missed injection of an optical fiber, at least a portion of the beam would very likely strike rear wall 148 and be reflected thereby, the reflection being detected by element 408. A missed injection could be caused by incorrect mirror positioning or a cracked focusing lens. Since enclosure 150 is light tight, a level increase detected by element 408 would indicate the missed injection. Note that an increase in light level resulting from the laser beam reflecting off of lens holder 114, under circumstances described above, may also be detected by element 408. Because system 100 is operated with a power laser, such a missed injection is an unacceptable malfunction requiring system shutdown. The increased level indication provided by element 408 is therefore used to shut down the laser, in a manner more fully described below. It is preferred herein that element 408 also be provided as the above-noted model OSI5L photodiode.

To further enhance operational safety of system 100, enclosure 150 engages a position switch 412 which provides an electrical contact closure only when the enclosure is properly positioned. Lasers, as is known in the art, are typically adapted to accommodate interlocking connections with external electrical contacts the closure of which represent enabling conditions to laser operation. Conversely the opening of each external contact so interlocked with the laser results in a shut down of laser operation. The closure of switch 412 is used as an enabling condition to laser operation. Further, should enclosure 150 become dislodged, during operation of system 100, such that the contact of switch 412 opens, the laser would be shut down.

Figure 5:
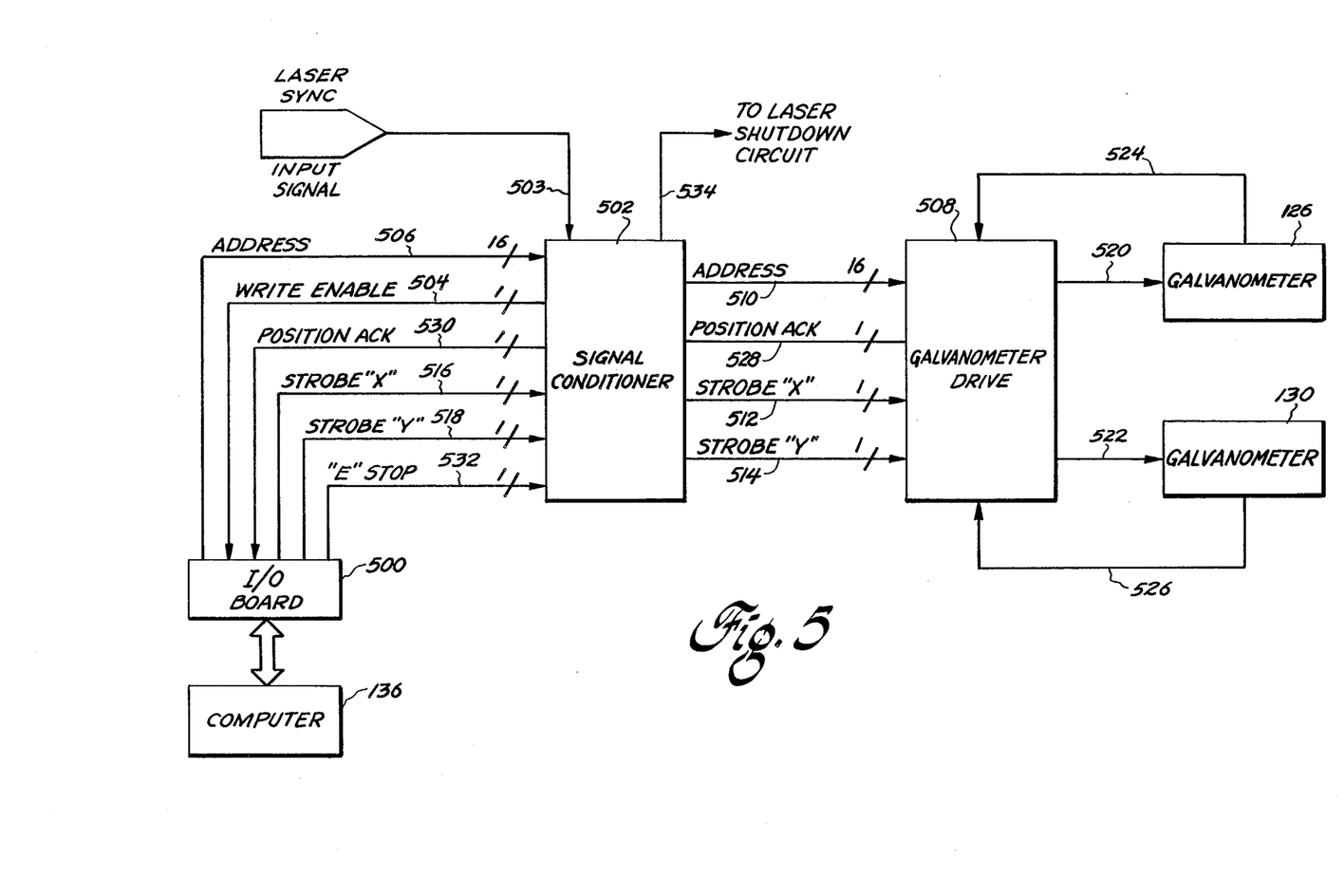
FIG. 5 is a block diagram representation of a control circuit employed in the practice of the beam injecting system illustrated in FIG. 1.

Means for the control of galvanometers 126 and 130 with computer 136 are illustrated in FIG. 5. Computer 136, which may comprise an IBM PC/AT computer, is coupled through a parallel I/O board 500 to a signal conditioner 502. Board 500 may be provided as a model #DDA-06 24-bit parallel I/O board manufactured by Metrabyte Corporation of Stoughton, Mass. Signal conditioner 502 is coupled to receive, on an input 503, a synchronizing input signal provided by the laser. The laser synchronizing signal consists of a sequence of pulses each of which immediately precedes a laser beam pulse, as is known in the art. The signal conditioner is adapted in response to the synchronizing signal to provide a pulsed write enable signal, to computer 136, on its output 504. Signal conditioner 502 adjusts the width and delay of each write enable pulse so that each pulse defines a window during which galvanometer driven mirrors 106, 110 can be moved from one to another of their predetermined positions.

Figure 6:
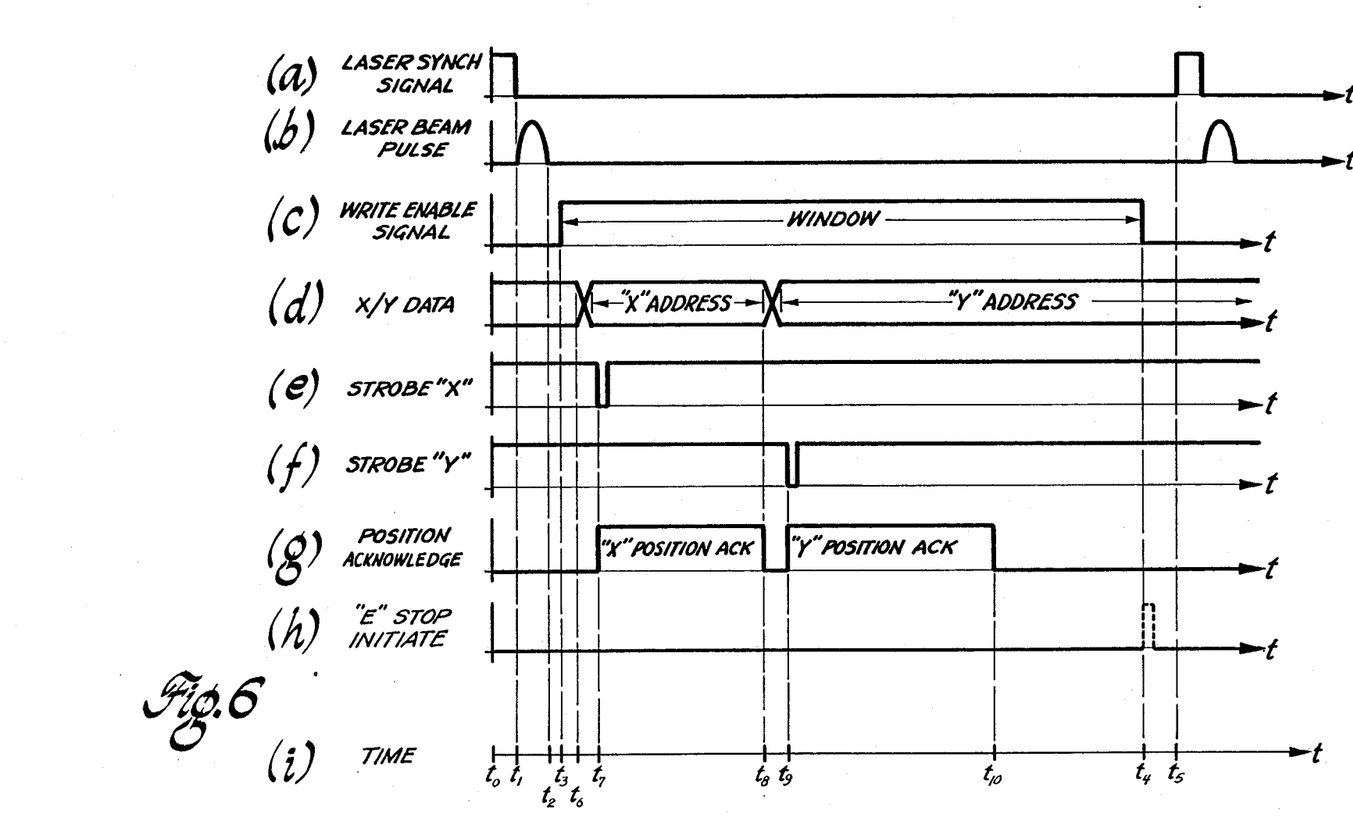
FIG. 6 illustrates a plurality of plots showing the time variation of various signals generated in the practice of the present invention.

Reference is also made to FIG. 6 which illustrates plots of various waveforms representative of signals generated during the operation of system 100. The horizontal and vertical axes on which each signal is plotted respectively represent time and signal magnitude. The times at which the various signals occur, as described hereinbelow, are noted on a time axis (plot (i)). Plot (a) represents the above-described laser synchronizing input signal. It is substantially a square waveform commencing at a time $t_0$ and terminating at a time $t_1$. The duration of the synchronizing signal is typically on the order of 100 microseconds. Plot (b) is representative of the beam pulse generated by the laser. As seen in FIG. 6, the beam pulse commences at a time $t_1$ substantially simultaneously with the termination of the synchronizing signal and terminates at a time $t_2$. In the practice of the present invention, each beam pulse of the above describe Nd:YAG laser is set to have a duration in the range of 0.6 to 7.0 milliseconds. The write enable signal is illustrated on plot (c) wherein the window opens at a time $t_3$ subsequent to the termination of the laser pulse at time $t_2$. The delay in the opening of the window following laser pulse termination is preferably on the order of 100 microseconds. The window is terminated, or closed, at a time $t_4$. The write enable signal, as generated by signal conditioner 502 for application to computer 136 assumes a logic '1' voltage level when the window is open and a logic '0' voltage level when the window is closed. The next laser synchronizing signal is illustrated on plot (a) and commences at a time $t_5$ subsequent to time $t_4$. Thus, the window closes prior to the next laser synchronizing signal. The duration from $t_4$ to $t_5$ is preferably on the order of 10 milliseconds. It is further preferred herein that the window closing be maintained in advance of the next laser synchronizing pulse by a substantially constant time duration, i.e. 10 milliseconds, irrespective of the laser beam pulse duration. Since the window cannot be opened until termination of the beam pulse, the window duration decreases as the beam pulse duration is lengthened.

Referring again to FIG. 5, within each window defined by the write enable signal, computer 136 is programmed to generate both a 16-bit "x" galvanometer position address and a 16-bit "y" galvanometer position address, each address so generated being applied to an input 506 of the signal conditioner. The "x" and "y" position addresses so generated correspond to the above described predetermined pair of positions to which mirrors 106 and 110 are respectively to be oriented. The signal conditioner in turn applies each digital address signal to a galvanometer driver 508 which drives galvanometers 126 and 130. Driver 508 is adapted to receive a 16-bit position address on an input 510 and treat that address as the "x" position address or the "y" position address depending on whether it receives a strobe signal respectively on a strobe "x" input 512 or a strobe "∓y" input 514. Generally, the signal conditioner is adapted to buffer signals being transmitted between the computer and galvanometer driver. The signal conditioner also provides compensation for interconnecting cable parameters. It is preferred herein that the signal conditioner be further adapted to optically isolate the laser synchronizing signal from the computer to avoid undesirable noise effects.

Computer 136, following generation of the "x" position address, generates a strobe "x" signal which is applied to an input 516 of the signal conditioner. Signal conditioner 502 applies the strobe "x" signal to driver input 512. Similarly, following generation of the "y" position address, the computer generates a strobe "y" signal which is applied to an input 518 of the signal conditioner. The signal conditioner then applies the strobe "y" signal to driver input 514.

Galvanometer driver 508 is further adapted to generate an analog signal corresponding to the digital position address applied thereto for application to the appropriate galvanometer. Thus, an output 520 of driver 508 is coupled to galvanometer 126 for applying an analog "x" position address signal. Further, an output 522 of driver 508 is coupled to galvanometer 130 for applying an analog "y" position address signal. Galvanometers 126 and 130 each feed back an analog position signal, on their respective outputs 524 and 526, to the galvanometer driver. The driver is thereby enabled to control the movement of each galvanometer in a closed loop fashion. Driver 508 is further adapted to provide a position acknowledge signal (position ack), on an output 528, which indicates when each galvanometer is oriented to the position corresponding to the desired 16-bit position address. Signal conditioner 502 is coupled to receive the position acknowledge signal generated by the galvanometer driver and provide that signal to the computer on an output 530. The above-noted model XY3035 galvanometer scanner manufactured by General Scanning, Inc. includes a galvanometer driver and two galvanometers adapted to be controlled and operate substantially as described hereinabove.

Referring again to FIG. 6, plot (d) illustrates generation by computer 136 of the "x" and "y" 16-bit position addresses. Generation of the "x" position address commences at a time $t_6$ substantially immediately following opening, at $t_3$, of the write enable window. The 16-bit address is represented by two signals respectively at '0' and '1' logic levels since each of the sixteen bits of the address may be either '0' or '1'. Generally, the computer maintains on its output the last address it generated. Thus at $t_6$, these two signals crossover to represent that some or all of the address bits are changed when the new address is generated by the computer. In practice, the address is generated by the IBM PC/AT computer in approximately 60 microseconds. As seen in plot (d), the x address is maintained, after generation, on the computer output and hence respectively on inputs 506 and 510 of the signal conditioner and galvanometer driver. As stated above, following generation of the "x" position address, the computer generates a strobe "x" signal which is applied to signal conditioner input 516 and hence driver input 512. The strobe "x" signal is illustrated on plot (e). It is preferred herein that the computer maintains a logic '1' voltage level on conditioner input 516. Then, the strobe "x" signal is a momentary drop in this signal to a logic '0' voltage level. This momentary drop is illustrated as commencing at a time $t_7$. In practice, the duration of the strobe "x" signal is on the order of 20 microseconds. The strobe signal applied by the signal conditioner to driver input 512 has the same form as illustrated in plot (e).

Substantially immediately upon receiving the strobe signal at $t_7$, driver 508 generates the position acknowledge signal. The latter signal is represented on plot (g) wherein driver output 528 rises to a logic '1' voltage level at $t_7$. This signal is indicated as the "x" position acknowledge signal since it follows receipt of the "x" strobe signal. The galvanometer driver is adapted to maintain the position acknowledge signal at the logic '1' level until a time $t_8$ when the shaft of galvanometer 126 reaches the position corresponding to the 16-bit "x" position address. At $t_8$, the position acknowledge signal drops to the '0' logic level in response to which computer 136 substantially immediately commences generation of the 16-bit "y" position address. This is represented on plot (d) where the two signals cross over to indicate a change in some or all of the address bits as the "y" address is generated. As was the case with the "x" address, the "y" address is maintained by the computer until the generation of the next address. Referring to plot (f), the strobe "y" signal is generated by the computer at a time $t_9$ following generation of the "y" address. The strobe "y" signal has the same form and duration as the strobe "x" signal. Referring again to plot (g), upon receiving the strobe "y" signal on input 514, driver 508 substantially immediately generates the "y" position acknowledge signal. That signal is maintained by the driver at the logic '1' voltage level until time $t_{10}$ when the shaft of galvanometer 130 is oriented to the position corresponding to the "y" position address.

Mirrors 106 and 110 must be reoriented to the predetermined position address pair before the write enable window closes. Thus in FIG. 6, time $t_{10}$, when both mirrors are reoriented, occurs prior to time $t_4$ when the window closes. If either position acknowledge signal is still at the logic '1' voltage level when the window closes, an undesirable situation exists wherein one or both mirrors are not correctly positioned as the next laser pulse is about to be generated. Computer 136 is programmed to recognize this situation and generate an emergency stop signal effective to shut down the laser. The emergency stop signal is represented on plot (h) as a pulse having a logic '1' voltage level magnitude. The emergency stop signal would occur substantially at $t_4$ upon the closing of the write enable window if either position acknowledge signal was at the logic '1' level at that time.

It is preferred herein that the emergency stop signal pulse be used to energize a relay, a normally closed contact of which is interlocked with the laser to enable continued laser operation. As a result, the energization of the relay causes the contact to open and the laser to be shut down. Referring again to FIG. 5, the emergency stop ("E" stop) signal, when generated by the computer is applied to an input 532. The circuitry for providing the contact opening in response to the emergency stop signal may be included within signal conditioner 502. In such a case, an output connection 534 emanates from the signal conditioner for an interlocking connection with the laser.

Figure 7:
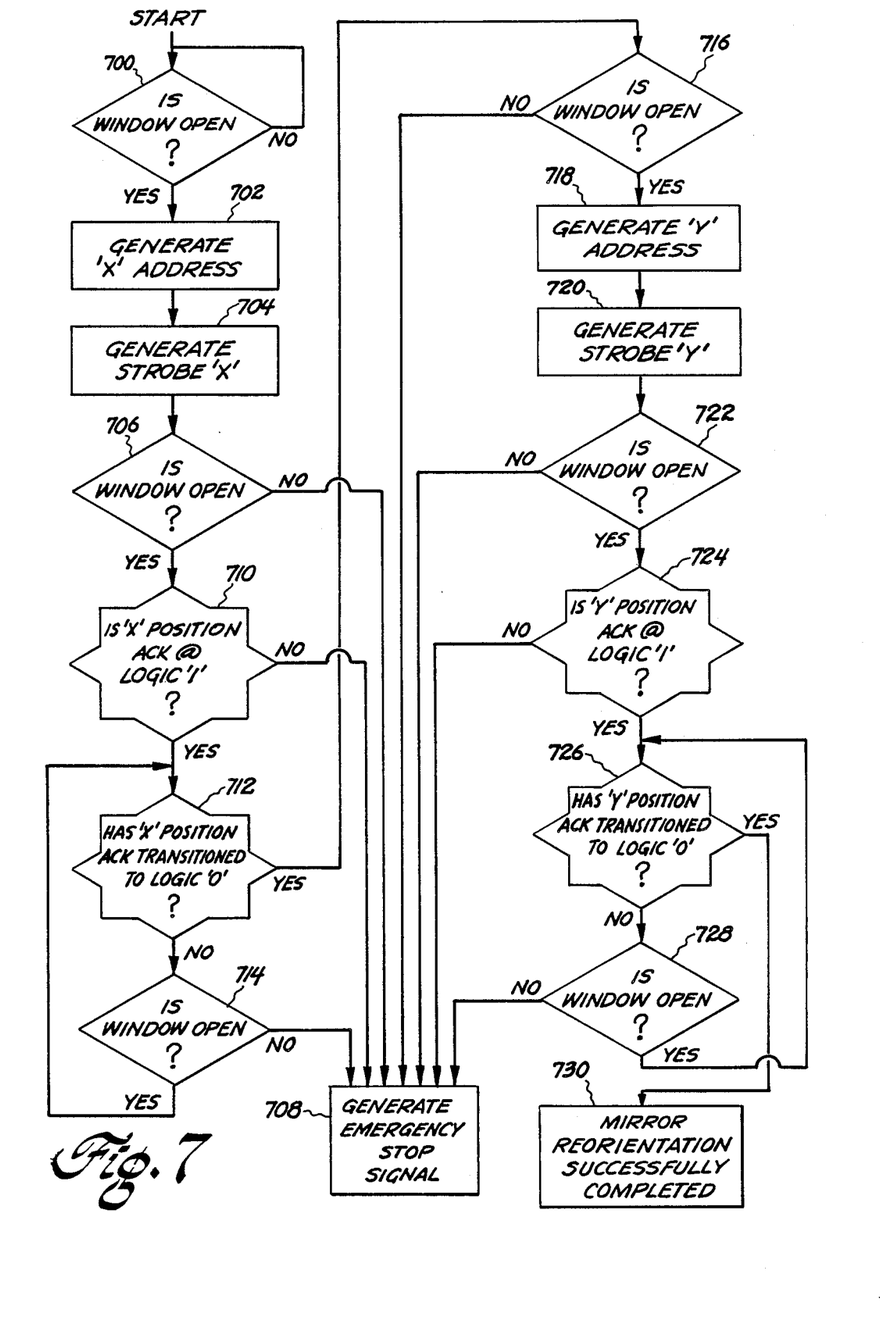
FIG. 7 is a flowchart representation of a program executed by the computer illustrated in FIG. 5.

The flowchart representation of the program followed by computer 136 to reorient mirrors 106 and 110 is illustrated in FIG. 7. The program starts at a step 700 wherein it is determined whether the write enable window is open. The program commences no further until the window is open. Upon the window opening, the program proceeds to step 702 in which the computer generates the 16 bit "x" position address and then proceeds to step 704 where the strobe "x" signal is generated. Then, at step 706 the program checks whether the window is still open and if it is not open, the laser emergency stop signal is generated, at step 708. If the window is open, the program executes step 710 in which it checks that the "x" position acknowledge signal is at the logic '1' voltage level, as it should be since the "x" strobe signal was just generated. If the "x" position acknowledge signal is not at the logic '1' level, indicating a malfunction of the galvanometer, step 708 is executed. However, if the signal is at the logic '1 level, the program enters a loop in which it alternately checks whether the "x" position acknowledge signal has transitioned to the logic '0' level (step 712) and whether the window is still open (step 714). This loop is executed until the window closes, in which case step 708 is executed, or until the desired position acknowledge signal transition occurs. In the latter case, the program proceeds to step 716 where it again confirms if the window is open and, if it is, proceeds to steps 718 and 720 where the "y" position address and strobe "y" signal are respectively generated. If the window is not open at step 716, the program proceeds to step 708. Following generation of the strobe "y" signal, the program again determines, at step 722, that the window is still open (if it is not, step 708 is executed) and then determines at step 724 whether the "y" position acknowledge signal is at the logic '1' voltage level, as it should be. If the signal is not at the logic '1 level, step 708 is executed. If the position acknowledge signal is found to be at the logic '1' level, the program enters a loop in which it alternately checks for the transition of the "y" position acknowledge signal to the logic '0' voltage level (step 726) and that the window remains open (step 728). If the window closes before the signal transitions to the logic '0' level, the program proceeds to step 708. Otherwise, upon transition of the "y" position acknowledge signal to the logic '0' level, the program determines (step 730) that both mirrors have been successfully reoriented to the desired "x" and "y" position addresses.

Figure 8:
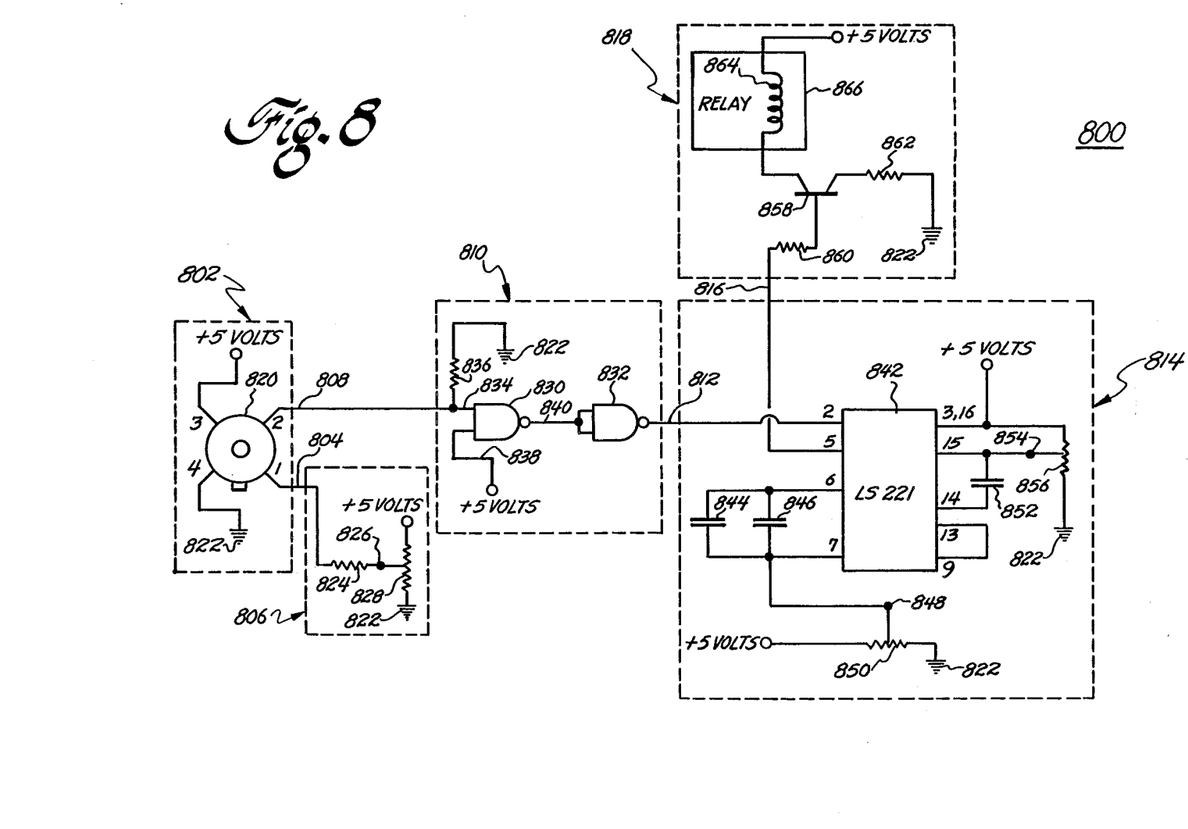
FIG. 8 illustrates an additional control circuit employed in the practice of the present invention.

As described above, an increase in the light level detected by either light sensitive element 404 or 408 indicates a malfunction requiring shutdown of the laser. A control circuit 800 to initiate laser shutdown in response to a detected increase in light level is illustrated in FIG. 8. One circuit 800 is required for each light sensitive element, so that two such circuits are required to initiate laser shutdown upon detection by either element 404 or 408 of an increase in light level. Circuit 800 includes a light sensitive element 802 which represents element 404 or 408. An output 804 of element 802 is connected to a level adjusting circuit 806 for adjusting a threshold light level which when exceeded results in element 802 providing a responsive signal. A second output 808 of element 802 is connected to a logic circuit 810 which provides a change in logic state of its signal on an output 812 when element 802 provides the signal indicating the threshold light level has been exceeded. A pulse generating circuit 814 is coupled to receive the signal on output 812 of logic circuit 810. Circuit 814 provides a pulse on an output 816 in response to the logic state change, on output 812 of logic circuit 810, indicating the threshold light level has been exceeded. Output 816 is applied to a relay circuit 818 which includes a normally closed contact interlocked with the laser as an enabling condition to laser operation. Relay circuit 818 is adapted in response to the pulse provided by circuit 814 to open that contact and thereby initiate shutdown of the laser.

The preferred circuitry with which the various elements of circuit 800 may be implemented is described next. Element 802 is provided as a photodiode 820. Photodiode 820 is preferably the above-noted Centronics model #OSI5L photodiode and the circuit connections thereto are illustrated in FIG. 8. Terminals 1 and 2 of the photodiode respectively serve as outputs 804 and 808. A terminal 3 of the photodiode is connected to a +5 Vdc voltage source. A photodiode terminal 4 is connected to a circuit common reference voltage point (e.g. ground) 822.

Level adjust means 806 simply comprises a resistor 824 connected at one end to an adjusting terminal 826 of a tapped resistor 828. The other end of resistor 824 is connected to terminal 1 of photodiode 820. Resistor 828 is connected at one end to the +5 Vdc source and at its other end to reference point 822. The point at which resistor 828 is tapped determines the voltage applied to photodiode terminal 1, that voltage being adjustable between 0 and +5 Vdc by moving the tap point on resistor 828. Photodiode 820 provides a logic '1' voltage level signal (approximately +5 Vdc) on terminal 2 (output 808) when the threshold light level is exceeded, that threshold level being determined by the voltage applied to photodiode terminal 1. Thus the threshold level is adjusted by moving the tap point on resistor 828. Note that the threshold adjustment is best made while system 100 operates in order to accurately establish the threshold light level.

Logic circuit 810 preferably comprises two NAND gates 830 and 832. A first input 834 of gate 830 is connected to photodiode terminal 2 (output 808). Input 834 is also connected to reference point 822 through a resistor 836 so that in the absence of a signal on photodiode terminal 2, input 834 is held at the logic '0' voltage level. A second terminal 838 of gate 830 is connected to the +5 Vdc source which serves as the logic '1' voltage level. The inputs of gate 832 are tied together and to an output 840 of gate 830. Thus when the light level detected by photodiode 820 is below the threshold level, a logic '0' level exists on input 834 of gate 830, a logic '1' level exists on gate output 840 and a logic '0' level exists on the output of gate 832 which serves as logic means output 812. Gate input 834 rises to the logic '1' voltage level when the threshold light level is exceeded and, as a result, the output of gate 832 (logic means output 812) transitions to a logic '1' voltage level.

Pulse generating circuit 814 preferably comprises a pulse width and delay conditioning integrated circuit chip 842, such as model LS221 manufactured by Texas Instruments Company. The circuit connections to the model LS221 integrated circuit chip are illustrated in FIG. 8. The output of NAND gate 832 (logic means output 812) is connected to a terminal 2 of chip 842. Two capacitors 844 and 846 are connected in parallel with one another and across chip terminals 6 and 7. Chip terminal 7 is also connected to an adjusting terminal 848 of a tapped resistor 850. One end of resistor 850 is connected to reference point 822 while the other end is connected to the +5 Vdc source. A capacitor 852 is connected across chip terminals 14 and 15. Terminal 15 is further connected to an adjusting terminal 854 of a tapped resistor 856. One end of resistor 856 is connected to chip terminals 3 and 16 and to the +5 Vdc source. The other end of resistor 856 is connected to reference point 822. A terminal 5 of chip 842 is connected to output 816 and hence to relay current 818.

Relay circuit 818 comprises an NPN transistor 858 the base of which is connected through a resistor 860 to output 816 of the pulse generating circuit. The emitter terminal of the transistor is connected through a resistor 862 to reference point 822. The collector terminal is connected to one end of a coil 864 (diagrammatically shown) of a relay 866. The other end of the coil is connected to the +5 Vdc source.

As previously stated, the signal output 812 of NAND gate 832 transitions to the logic '1' level when the light detected by the photodiode exceeds the threshold level. Chip 842 generates a positive voltage pulse on its terminal 5 in response to the signal on chip terminal 2, connected to output 812, transitioning to the logic '1' level. The values selected for capacitors 844 and 846 and the tapped value of resistor 850 determine the width of the generated pulse. The value of capacitor 852 and the tapped value of resistor 856 determine a delay in the generation of the pulse. For the below listed exemplary values of the capacitors and resistors, the generated pulse has a width of 20 milliseconds and a delay of less than 10 microseconds. The pulse renders transistor 858 conductive and as a result the relay coil is energized. A contact of the relay interlocked to enable laser operation when closed, opens when the coil is energized. The contact opening therefore results in the laser being shut down, this being the desired result when the light level detected by either light sensitive element exceeds the threshold value.

It is noted that while the signal provided by either light sensitive element, upon detecting a light level exceeding the threshold level, could be provided to the computer for generation of the emergency stop signal, this is intentionally avoided. This is because one of the failure modes that may be detected by either light sensitive element is a computer malfunction. Generation by the computer of erroneous position addresses would result in missed fiber injections or mirror positions resulting in the laser beam remaining within the mirror enclosure.

Exemplary components for circuit 800 are as follows:

| | |
|---|---|
| photodiode 820 | Centronics OSI5L |
| resistor 824 | 10,000 ohms |
| resistor 828 | 100,000 ohms |
| resistor 836 | 510 ohms |
| NAND gate 830 | 74LS132 |
| NAND gate 832 | 74LS132 |
| Capacitor 844 | 1 μfd |
| Capacitor 846 | 1 μfd |
| Resistor 850 | 50,000 ohms |
| Capacitor 852 | 1 μfd |
| Resistor 856 | 20,000 ohms |
| Transistor 858 | 2N2222 |
| Resistor 860 | 10,000 ohms |
| Resistor 862 | 10,000 ohms |
| Relay 866 | Aromat DR-5V |

In operation, system 100 is connected through optical fibers 104 to one or more workstation locations. Computer 136 is programmed to provide a sequence of 16 bit "x" and "y" galvanometer position address pairs, each pair corresponding to mirror positions effective to focus the laser beam, through one of lenses 112, onto the tip of a particular optical fiber. Thus, the sequence of position address pairs defines a sequence of fibers into which successive pulses of the laser are to be injected and, hence, workstation locations to which the beam is to be transmitted. As a result, system 100 operates in a hot switching mode wherein mirrors 106 and 110 are repositioned only between successive laser pulses.

System 100 as described hereinabove is further adapted during operation, to minimize damage to components therein and injury to personnel attendant thereto. Light sensitive elements 404 and 408 and their respective control circuits are adapted to shut down the laser in the event of a component malfunction or failure which would otherwise result in component damage or personnel injury. The generation of a write enable signal synchronized to the laser pulses and the programming of computer 136 assure substantially immediate shutdown of the laser should reorientation of the mirrors not be completed, for whatever reason, prior to closing of the write enable window. Opening 147 in the mirror enclosure assures that all trajectories of the reflected laser beam are constrained to strike the lens holder and be detected by at least one of the light sensitive elements. Position switch 412 assures the laser cannot be operated if enclosure 150 is not properly positioned to enclose system 100. In the event of a computer failure resulting in a loss of the address signals generated thereby, the laser is safely directed into heat sink 406.

While the beam injecting system of the present invention as described and illustrated hereinabove includes two mirrors for respectively scanning the laser beam along "x" and "y" coordinate directions, the invention is not so limited. The invention may instead be practiced with a single mirror mounted on a galvanometer shaft for scanning the laser beam along a single coordinate direction for focusing into fiber tips all positioned substantially in the same plane. In such a single mirror system, the control means would require modification to control a single galvanometer rather than two galvanometers. Further, while the illustrated embodiment includes a plurality of focusing lenses, the invention may be practiced using a single lens with a plurality of fiber tips positioned proximate the focal point thereof.

While the illustrated embodiment of the present invention is preferably practiced with the model XY3035 galvanometer scanner manufactured by General Scanning, the invention is not so limited. The invention may instead be practiced with each galvanometer provided as a discrete element and with a control circuit adapted to separately drive each of the two galvanometers. Such discrete galvanometers suitable for practicing the present invention may be provided as the General Scanning model G350DT galvanometer scanner and associated model CX660 driver amplifier. In the control circuit to drive the discrete galvanometers, each digital address generated by the computer would be applied, during the write enable window, to a digital-toanalog converter dedicated to the appropriate one of the two galvanometers. Through analog signal amplification and galvanometer position feedback, a separate error signal would be generated to drive the mirror mounted on each galvanometer to the desired position. By detecting the magnitude of each error signal, the computer would determine whether both mirrors were successfully reoriented to the desired positions within the write enable window and, if this did not occur, generate the emergency stop signal.

While the illustrated embodiment of the present invention comprises two mirrors wherein the first mirror directs the laser beam onto the second mirror, and the first and second mirrors respectively scan the laser beam along the "x" and "y" coordinate axis directions, the invention is not so limited. The mirrors can instead be arranged so that the first and second mirrors respectively position the laser beam along the "y" and "x" coordinate axis directions.

The computer in the illustrated embodiment of the present invention provides 16-bit galvanometer position addresses. The invention may be practiced with a computer that generates bit address of other suitable sizes.

The elements of the illustrated embodiment of the present invention, including the galvanometers, lenses and fiber holders are indicated as being rigidly mounted. It is preferred herein that the alignment and positions of these elements be precisely determined in advance and the elements rigidly mounted without margin for movement. Such precise layout facilitates later manufacture of the beam injecting system. The invention is, however, not so limited. The various elements could each instead be mounted in a manner enabling small adjustments in their respective positions, e.g. such as by use of clearance holes, and rigidly fixing the respective elements after the desired alignment is achieved.

It is further noted that the practice of the present invention is not limited to the use of a mirror coating which provides a maximum reflectivity at a prescribed angle of 45°. The prescribed angle of 45° derives from the preferred mounting of each mirror, in the embodiment illustrated and described hereinabove, so that the range of mirror movement is about a nominal beam incident angle of 45°. Each mirror used herein may instead be mounted so that its range of movement is about a prescribed angle other than 45°. In such a case each mirror would be coated to provide substantially maximum reflectivity about its corresponding prescribed angle.

While the present invention as described hereinabove enables directing each successive laser beam pulse into a different optical fiber, the invention is not so limited. A plurality of successive pulses may be directed into the same fiber before the beam is redirected into a different fiber. This can be simply accomplished by programming the computer to repetitively generate the same position address a desired number of times. The directing of successive pulses into a single fiber is especially advantageous where the operation, e.g. cutting or drilling, being performed at a workstation at the remote end of the fiber, requires substantial laser energy.

While the present invention as described hereinabove is preferably practiced using a pulsed laser, the invention is not so limited. Instead, by using mechanical chopping techniques known in the art, a beam from a continuous wave laser can be converted into a string of pulses having a predetermined frequency with each pulse having a predetermined duration.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. Apparatus for injecting a pulsed laser beam generated by a laser into one of a plurality of optical fibers, comprising;
    a lens for focusing said laser beam;
    means for supporting a group of said optical fibers with the tips thereof positioned proximate a focal point of said lens;
    means for reflecting said laser beam;
    positioning means for orienting said reflecting means into predetermined positions each effective to reflect said laser beam through said lens onto a different selected one of said fiber tips for injection therein;
    control means for controlling said positioning means, said control means including:
        means for generating an enable signal substantially synchronized to the pulsing of said laser beam, said enable signal including periodic window portions each of which correspond to said laser beam being in an off state between pulses; and
        processing means, responsive to said enable signal, for generating an address signal substantially immediately following commencement of a current one of said window portions, said processing means adapted to generate a sequence of said address signals corresponding to said predetermined positions, each said address signal being effective to cause said positioning means to orient said reflecting means into the corresponding predetermined position;
    said positioning means providing an indication to said processing means upon successfully orienting said reflecting means into said predetermined position; and
    said processing means adapted to generate a laser shutdown signal if said reflecting means is not successfully oriented into said predetermined position upon termination of said current window portion of said enable signal.

2. The apparatus of claim 1 and further including means for dissipating the energy of a laser beam incident thereon; and
    said positioning means adapted to orient said reflecting means to a rest position in the absence of said address signal, said reflecting means in said rest position reflecting said laser beam into said beam dissipating means.

3. The apparatus of claim 1 wherein said address signals are digital in form;
    said reflecting means comprising a first and a second mirror for respectively scanning said laser beam along a first and a second coordinate axis direction;
    said positioning means comprising a first and a second galvanometer each having a movable shaft on which said first and second mirrors are respectively supported;
    said processing means adapted to generate a first and a second one of said address signals for respective application to said first and second galvanometers during said current window portion of said enable signal; and
    said control means further including means for converting said first and second address signals from digital form into an analog form suitable for application to said first and second galvanometers, respectively.

4. The apparatus of claim 1 and further including means for detecting a malfunction of said reflecting means and for providing an indication of the reflecting means malfunction; and
    circuit means responsive to the indication of the reflecting means malfunction to shut down said laser.

5. The apparatus of claim 1 and further including means for detecting a missed fiber injection, said missed injection detecting means adapted to provide an indication of the missed injection; and
    missed injection circuit means responsive to the missed injection indication to shut down said laser.

6. The apparatus of claim 1 and further including:
    an enclosure for enclosing said reflecting means, said enclosure including a first aperture adapted to admit only an incident portion of said laser beam and a second aperture adapted to enable exit of a reflected portion of said laser beam; and said second aperture being configured to limit a maximum angle of trajectory along which the reflected portion of said laser beam can exit from said enclosure.

7. The apparatus of claim 3 wherein said processing means comprises a digital computer for generating said address signals.

8. The apparatus of claim 4 and further including:
a first enclosure for enclosing said reflecting means, said first enclosure being adapted to admit only an incident portion of said laser beam and enable exit of a reflected portion of said laser beam;

a second substantially light tight enclosure for containing said lens and said supporting means as well as said first enclosure so that ambient light is substantially excluded from the interior of said second enclosure; and said malfunction detecting means comprising a light sensitive element positioned to provide indication of an increase in the light level within said first enclosure above a threshold light level, said threshold level corresponding to said reflecting means correctly reflecting said laser beam onto said selected fiber tip, the increase in the light level within said first enclosure above said threshold level being indicative of the malfunction of said reflecting means.

9. The apparatus of claim 8 wherein said light sensitive element is a photodiode.

10. The apparatus of claim 5 and further including a rear wall positioned beyond said supporting means along the trajectory of a reflected portion of said laser beam;

a substantially light tight enclosure for containing said reflecting means and said lens as well as said supporting means so that ambient light is substantially excluded from the interior of said enclosure, said enclosure adapted to enable entry therein of an incident portion of said laser beam; and said missed injection detecting means comprising a light sensitive element mounted within said enclosure and adapted to indicate an increase in the light level proximate said rear wall above a threshold light level corresponding to the correct injection of said laser beam into each said fiber tip, the detected increase in the rear wall light level above said threshold level being indicative of said missed injection.

11. The apparatus of claim 10 and further including means for detecting when said enclosure becomes dislodged, said dislodged enclosure detecting means being adapted to provide an indication of the dislodging of said enclosure; and dislodged enclosure circuit means responsive to the dislodged enclosure indication to shut down said laser.

12. The apparatus of claim 6 and further including a lens holder in which to mount said lens; and said lens holder presenting a surface area effective to intersect all trajectories along which said laser beam can exit said second aperture.

13. Apparatus for injecting a pulsed laser beam provided by a pulsed power laser into one of a plurality of optical fibers, comprising:
a first lens;
a second lens;
a third lens;
a fourth lens;
first means for supporting at least one of said optical fibers with the tip thereof positioned proximate a focal point of said first lens;
second support means for supporting at least one of said optical fibers with the tip thereof positioned proximate a focal point of said second lens;
third support means for supporting at least one of said optical fibers with the tip thereof positioned proximate a focal point of said third lens;
fourth support means for supporting at least one of said optical fibers with the tip thereof positioned proximate a focal point of said fourth lens;
a first mirror for scanning said laser beam along a first one of two axis directions;
a second mirror for scanning said laser beam along a second one of said two axis directions;
said first mirror positioned to direct said laser beam onto said second mirror;
a first galvanometer having a shaft on which said first mirror is supported;
a second galvanometer having a shaft on which said second mirror is supported;
said first and second galvanometers adapted to respectively orient said first and second mirrors into pairs of predetermined positions, each said predetermined position pair being effective to direct said laser beam through a selected one of said lenses for selectively focusing said laser beam separately onto each said fiber tip positioned proximate the focal point of said lens;
control means for controlling said first and second galvanometers, said control means including:
means for generating an enable signal substantially synchronized to the pulsing of said laser beam, said enable signal including periodic window portions each of which correspond to said laser beam being in an off state between pulses; and
processing means, responsive to said enable signal, for generating pairs of address signals respectively representative of said predetermined position pairs, said processing means generating one of said address signal pairs substantially immediately upon commencement of a current one of said window portions;
said first and second galvanometers responsive to each said address signal pair to orient said first and second mirrors to the predetermined position pair represented thereby;
said processing means adapted to determine whether said first and second galvanometers successfully orient said first and second mirrors to the predetermined position pair before termination of said current window portion; and
said processing means further adapted to generate a laser shutdown signal when said first and second mirrors are not oriented to the predetermined position pair upon termination of said current window portion.

14. The apparatus of claim 13 wherein said processing means comprises a digital computer for generating said address signals.

15. The apparatus of claim 13 and further including means for dissipating the energy of a laser beam incident thereon; and said first and second galvanometers adapted to respectively orient said first and second mirrors to a rest position in the absence of said address signals, said first and second mirrors in said rest position reflecting said beam into said beam dissipating means.

16. The apparatus of claim 13 and further including:
a first enclosure for enclosing said first and second mirrors, said first enclosure being adapted to admit only an incident portion of said laser beam and enable exit of a reflected portion of said laser beam;
a second substantially light tight enclosure for containing said first, second, third and fourth lenses and said supporting means as well as said first enclosure so that ambient light is substantially excluded from the interior of said second enclosure;
a light sensitive element positioned to provide indication of an increase in the light level within said first enclosure above a threshold light level, said threshold level corresponding to said first and second mirrors correctly reflecting said laser beam onto said selected fiber tip, the increase in the light level within said first enclosure above said threshold level being indicative of an incorrect reflection; and
circuit means responsive to the indicated enclosure light level increase above said threshold level to shut down said laser.

17. The apparatus of claim 13 and further including a rear wall positioned beyond said supporting means along a trajectory of a reflected portion of said laser beam;
a substantially light tight enclosure for containing said first and second mirrors and said first, second, third and fourth lenses as well as said supporting means so that ambient light is substantially excluded from the interior of said enclosure, said enclosure adapted to enable entry therein of an incident portion of said laser beam;
a light sensitive element mounted within said enclosure and adapted to indicate an increase in the light level proximate said rear wall above a threshold light level, said threshold level corresponding to the correct injection of said laser beam into each said fiber tip, the detected increase in the rear wall light level above said threshold level being indicative of a missed fiber injection; and
missed injection circuit means responsive to the indicated increase in rear wall light level above said threshold level, to shut down said laser.

18. The apparatus of claim 13 and further including:
a substantially light tight enclosure for containing said first and second mirrors and said first, second, third and fourth lenses as well as said supporting means so that ambient light is substantially excluded from the interior of said enclosure, said enclosure adapted to enable entry therein of an incident portion of said laser beam;
a light sensitive element mounted within said enclosure and adapted to indicate an increase in the light level proximate said rear wall above a threshold light leVel, said threshold level corresponding to the correct injection of said laser beam into each said fiber tip, the detected increase in the rear wall light level above said threshold level being indicative of a missed fiber injection; and
missed injection circuit means responsive to the indicated increase in rear wall light level above said threshold level, to shut down said laser.
an enclosure for enclosing said first and second mirrors, said enclosure including a first aperture adapted to admit only an incident portion of said laser beam and a second aperture adapted to enable exit of a reflected portion of said laser beam; and
said second aperture being configured to limit a maximum angle of trajectory along which the reflected portion of said laser beam can exit from said enclosure.

19. The apparatus of claim 16 wherein said light sensitive element is a photodiode.

20. The apparatus of claim 17 and further including means for detecting when said enclosure becomes dislodged, said dislodged enclosure detecting means being adapted to provide an indication of the dislodging of said enclosure; and
dislodged enclosure circuit means responsive to the dislodged enclosure indication to shut down said laser.

21. The apparatus of claim 18 and further including a lens holder in which said lenses are mounted; and
said lens holder presenting a surface area effective to intersect all trajectories along which said laser beam can exit said second aperture.

* * * * *